US011719807B2

(12) United States Patent
Bliss

(10) Patent No.: US 11,719,807 B2
(45) Date of Patent: Aug. 8, 2023

(54) PHASE-ACCURATE VEHICLE POSITIONING SYSTEMS AND DEVICES

(71) Applicant: Daniel W. Bliss, Scottsdale, AZ (US)

(72) Inventor: Daniel W. Bliss, Scottsdale, AZ (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 83 days.

(21) Appl. No.: 16/767,043

(22) PCT Filed: Dec. 20, 2018

(86) PCT No.: PCT/US2018/066763
§ 371 (c)(1),
(2) Date: May 26, 2020

(87) PCT Pub. No.: WO2019/126476
PCT Pub. Date: Jun. 27, 2019

(65) Prior Publication Data
US 2020/0319330 A1 Oct. 8, 2020

Related U.S. Application Data

(60) Provisional application No. 62/608,500, filed on Dec. 20, 2017.

(51) Int. Cl.
*G01S 13/84* (2006.01)
*G01S 7/00* (2006.01)
*H04W 4/02* (2018.01)

(52) U.S. Cl.
CPC ............. *G01S 13/84* (2013.01); *G01S 7/003* (2013.01); *H04W 4/02* (2013.01)

(58) Field of Classification Search
CPC ........ G01S 13/84; G01S 13/876; G01S 7/003; H04W 4/02; H04W 64/003; H04W 4/023; H04W 4/029
See application file for complete search history.

(56) References Cited

U.S. PATENT DOCUMENTS 4,648,099 A   3/1987  Kerr
5,510,800 A   4/1996  McEwan
(Continued)

FOREIGN PATENT DOCUMENTS

CA   2296812 A1   8/2000
EP   2137547 B1   12/2009

OTHER PUBLICATIONS

Notice of Allowance for U.S. Appl. No. 16/787,300, dated Sep. 3, 2021, 8 pages.
(Continued)

*Primary Examiner* — Peter M Bythrow
(74) *Attorney, Agent, or Firm* — Withrow & Terranova, P.L.L.C.; Vincent K. Gustafson

(57) ABSTRACT

Systems and devices for phase-accurate vehicle positioning are disclosed. These systems and devices facilitate high-precision estimations of positions, orientations, velocities, and accelerations of signal nodes in a distributed network (e.g., including base stations and vehicles, such as aircraft or unmanned aerial systems (UASs)). The positioning estimations are based on time-of-arrival estimations of low-bandwidth signals and a phase-accurate distributed coherence algorithm. In some cases, the low-bandwidth signals may further facilitate joint communications and positioning estimations between the signal nodes.

19 Claims, 10 Drawing Sheets

(56) References Cited

U.S. PATENT DOCUMENTS

| | | | |
|---|---|---|---|
| 5,592,181 A * | 1/1997 | Cai | G01S 5/04 342/442 |
| 6,204,812 B1 * | 3/2001 | Fattouche | G01S 5/0009 375/350 |
| 6,421,330 B1 | 7/2002 | Chung et al. | |
| 6,611,234 B2 | 8/2003 | Fullerton et al. | |
| 6,687,507 B2 | 2/2004 | Fischer et al. | |
| 7,173,919 B1 | 2/2007 | Dabak | |
| 7,286,624 B2 | 10/2007 | Woo et al. | |
| 7,639,730 B2 | 12/2009 | Rasmussen | |
| 7,710,321 B2 | 5/2010 | Heidari-Bateni et al. | |
| 8,184,504 B2 * | 5/2012 | Altman | G01S 11/08 367/124 |
| 8,253,627 B1 * | 8/2012 | Burgess | G01S 5/145 342/465 |
| 8,442,172 B1 | 5/2013 | Dokania et al. | |
| 9,019,159 B2 | 4/2015 | van Puijenbroek et al. | |
| 9,060,342 B2 * | 6/2015 | Wu | G01S 5/10 |
| 9,756,599 B2 | 9/2017 | Fischer | |
| 9,774,996 B1 | 9/2017 | Frydman et al. | |
| 9,883,348 B1 | 1/2018 | Walker et al. | |
| 10,681,669 B2 | 6/2020 | Priyanto et al. | |
| 2003/0080902 A1 | 5/2003 | Roberts | |
| 2005/0047427 A1 * | 3/2005 | Kashima | H04B 7/2628 370/479 |
| 2007/0109188 A1 * | 5/2007 | Zimmerman | G01S 19/44 342/464 |
| 2008/0165059 A1 | 7/2008 | Karr | |
| 2009/0285339 A1 | 11/2009 | Zhang et al. | |
| 2010/0226454 A1 | 9/2010 | Bliss et al. | |
| 2010/0271263 A1 | 10/2010 | Moshfeghi | |
| 2010/0273506 A1 | 10/2010 | Stern-Berkowitz et al. | |
| 2010/0304708 A1 | 12/2010 | McCrady et al. | |
| 2011/0158200 A1 | 6/2011 | Bachu et al. | |
| 2012/0026041 A1 | 2/2012 | Murdock et al. | |
| 2012/0169542 A1 * | 7/2012 | Mathews | G01S 19/256 342/450 |
| 2013/0184011 A1 | 7/2013 | Kaushansky | |
| 2013/0285856 A1 | 10/2013 | Opshaug et al. | |
| 2014/0105054 A1 * | 4/2014 | Sægrov et al. | G01S 5/12 370/252 |
| 2014/0186037 A1 | 7/2014 | Dahlfort et al. | |
| 2015/0282112 A1 * | 10/2015 | Bialer | G01S 5/0273 455/456.1 |
| 2016/0252624 A1 | 9/2016 | MacCurdy et al. | |
| 2016/0302165 A1 | 10/2016 | Da et al. | |
| 2017/0003376 A1 | 1/2017 | Wellman et al. | |
| 2017/0367065 A1 | 12/2017 | Seth et al. | |
| 2018/0227877 A1 | 8/2018 | Gunnarsson et al. | |
| 2019/0200164 A1 | 6/2019 | Sanderovich et al. | |

OTHER PUBLICATIONS

Bidigare, P. et al., "Attaining Fundamental Bounds on Timing Synchronization," 2012 IEEE International Conference on Acoustics, Speech and Signal Processing (ICASSP 2012), Mar. 25-30, 2012, Kyoto, Japan, IEEE, pp. 5229-5232.

Bidigare, P. et al., "Initial Over-the-Air Performance Assessment of Ranging and Clock Synchronization Using Radio Frequency Signal Exchange," 2012 IEEE Statistical Signal Processing Workshop (SSP), Aug. 5-8, 2012, Ann Arbor, MI, IEEE, pp. 273-276.

Bliss, D. et al., "Adaptive Wireless Communications: MIMO Channels and Networks," 2013, Cambridge University Press, 619 pages.

Busse, F.D. et al., "Demonstration of Adaptive Extended Kalman Filter for Low-Earth-Orbit Formation Estimation Using CDGPS," Navigation: Journal of the Institute of Navigation, vol. 50, No. 2, Summer 2003, pp. 79-93.

Denis, B. et al., "Joint Distributed Synchronization and Positioning in UWB Ad Hoc Networks Using TOA," IEEE Transactions on Microwave Theory and Techniques, vol. 54, No. 4, Apr. 2006, IEEE, pp. 1896-1911.

Guvenc, I. et al., "A Survey on TOA Based Wireless Localization and NLOS Mitigation Techniques," IEEE Communications Surveys & Tutorials, vol. 11, No. 3, Third Quarter 2009, IEEE, pp. 107-124.

Kay, S.M., "Fundamentals of Statistical Signal Processing, vol. I: Estimation Theory," 1993, Prentice Hall, 303 pages.

Kim, H., "Double-Sided Two-Way Ranging Algorithm to Reduce Ranging Time," IEEE Communications Letters, vol. 13, No. 7, Jul. 2009, IEEE, pp. 486-488.

Lanzisera, S. et al., "Radio Frequency Time-of-Flight Distance Measurement for Low-Cost Wireless Sensor Localization," IEEE Sensors Journal, vol. 11, No. 3, Mar. 2011, IEEE, pp. 837-845.

Li, Q. et al., "Global Clock Synchronizationin Sensor Networks," IEEE Transactions on Computers, vol. 55, No. 2, Feb. 2006, IEEE, pp. 214-226.

Li, X.R. et al., "Survey of ManeuveringTarget Tracking. Part 1: Dynamic Models," IEEE Transactions on Aerospace and Electronic Systems, vol. 34, No. 4, Oct. 2003, IEEE, pp. 1333-1364.

Liu, H. et al., "Survey of Wireless Indoor Positioning Techniques and Systems," IEEE Transactions on Systems, Man, and Cybernetics—Part C: Applications and Reviews, vol. 37, No. 6, Nov. 2007, IEEE, pp. 1067-1080.

Mills, D.L. et al., "Internet Time Synchronization: The Network Time Protocol," IEEE Transactions on Communications, vol. 39, No. 10, Oct. 1991, IEEE, pp. 1482-1493.

Mills, D.L., "Network Time Protocol (Version 3) Specification, Implementation and Analysis," Network Working Group, Request for Comments: 1305, Mar. 1992, 120 pages.

Oh, D.-G., "A Novel Time Delay Estimation Using Chirp Signals Robust to Sampling Frequency Offset for a Ranging System," IEEE Communications Letters, vol. 14, No. 5, May 2010, IEEE, pp. 450-452.

Paul, B. et al., "Survey of RF Communications and Sensing Convergence Research," Survey of RF Communications and Sensing Convergence Research, vol. 5, 2017, IEEE, 20 pages.

Pelka, M. et al., "Evaluation of time-based ranging methods: Does the choice matter?," 2017 14th Workshop on Positioning, Navigation and Communications (WPNC), Oct. 25-26, 2017, Bremen, IEEE, 6 pages.

Sundararaman, B. et al., "Clock synchronization for wireless sensor networks: a survey," Ad Hoc Networks, vol. 3, Issue 3, 2005, Elsevier B.V., pp. 281-323.

Zucca, C. et al., "The Clock Model and Its Relationship with the Allan and Related Variances," IEEE Transactions on Ultrasonics, Ferroelectrics, and Frequency Control, vol. 52, No. 2, Feb. 2005, IEEE, pp. 289-296.

Herschfelt, A. et al., "Spectrum Management and Advanced Receiver Techniques (SMART): Joint Radar-Communications Network Performance," 2018 IEEE Radar Conference (RadarConf18), Apr. 23-27, 2018, Oklahoma City, OK, USA, IEEE, 6 pages.

Ma, O. et al., "Cooperative Radar and Communications Coexistence Using Reinforcement Learning," 2018 52nd Asilomar Conference on Signals, Systems, and Computers, Oct. 28-31, 2018, IEEE, Pacific Grove, CA, IEEE, 5 pages.

Rong, Y. et al.,"MIMO Radar and Communications Spectrum Sharing: A Multiple-Access Perspective," 2018 IEEE 10th Sensor Array and Multichannel Signal Processing Workshop (SAM), Jul. 8-11, 2018, Sheffield, UK, IEEE, 5 pages.

Non-Final Office Action for U.S. Appl. No. 17/521,490, dated Nov. 10, 2022, 7 pages.

Non-Final Office Action for U.S. Appl. No. 17/089,074, dated Nov. 18, 2022, 18 pages.

Bliss, D., "Cooperative radar and communications signaling: Theestimation and information theory odd couple," 2014 IEEE Radar Conference, May 19-23, 2014, Cincinnati, OH, USA, IEEE, 6 pages.

Brown III, D.R. et al., "Non-Hierarchical Clock Synchronization for Wireless Sensor Networks," arXiv:1212.1216v1 [nlin.AO], Dec. 6, 2012, 8 pages.

Chiriyath, A. et al., "Inner Bounds on Performance of Radar and Communications Co-Existence," IEEE Transactions on Signal Processing, vol. 64, Issue 2, Sep. 2015, IEEE, pp. 464-474.

Chiriyath, A.R. et al., "Joint radar-communications performance bounds: Data versus estimation information rates," MILCOM 2015—

(56) References Cited

OTHER PUBLICATIONS

2015 IEEE Military Communications Conference, Oct. 26-28, 2015, Tampa, FL, USA, IEEE, 6 pages.

Chiriyath, A. et al., "Radar-Communications Convergence: Coexistence, Cooperation, and Co-Design," IEEE Transactions on Cognitive Communications and Networking, vol. 3, No. 1, Feb. 2017, IEEE, 13 pages.

Gelb, A., "Applied optimal estimation," MIT press, Apr. 1974, 192 pages.

Gutierrez, R. et al., "Joint radar-communications system implementation using software defined radios: Feasibility and results," 2017 51st Asilomar Conference on Signals, Systems, and Computers, Oct. 29-Nov. 1, 2017, Pacific Grove, CA, USA, IEEE, 6 pages.

Herschfelt, A., "Simultaneous Positioning and Communications:Hybrid Radio Architecture, Estimation Techniques, and Experimental Validation," A Dissertation Presented in Partial Fulfillment of the Requirement for the Degree Doctor of Philosophy, Arizona State University, Dec. 2019, 119 pages.

Paul, B. et al., "Constant information radar for dynamic shared spectrum access," 2015 49th Asilomar Conference on Signals, Systems and Computers, Nov. 8-11, 2015, Pacific Grove, CA, USA, IEEE, 5 pages.

Paul, B. et al., "Extending joint radar-communications bounds for fmcw radar with doppler estimation," 2015 IEEE Radar Conference(RadarCon), May 10-15, 2015, Arlington, VA, USA, IEEE, 6 pages.

Paul, B. et al., "Joint communications and radar performance bounds under continuous waveform optimization: The waveform awakens," 2016 IEEE Radar Conference (RadarConf), May 2-6, 2016, Philadelphia, PA, USA, IEEE, 6 pages.

Paul, B. et al., "The Constant Information Radar," Entropy, vol. 18, No. 9, Sep. 2016, MDPI, 23 pages.

Non-Final Office Action for U.S. Appl. No. 16/787,300, dated May 12, 2021, 9 pages.

International Search Report and Written Opinion for International Patent Application No. PCT/US2018/066763, dated Apr. 29, 2019, 10 pages.

International Preliminary Report on Patentability for International Patent Application No. PCTIUS2018/066763, dated Jul. 2, 2020, 7 pages.

Final Office Action for U.S. Appl. No. 17/521,490, dated Mar. 31, 2023, 8 pages.

Applicant-Initiated Interview Summary for U.S. Appl. No. 17/089,074, dated Jan. 27, 2023, 6 pages.

Non-Final Office Action and Examiner-Initiated Interview Summary for U.S. Appl. No. 17/089,086, dated Mar. 22, 2023, 20 pages.

Final Office Action for U.S. Appl. No. 17/089,074, dated Apr. 19, 2023, 17 pages.

* cited by examiner

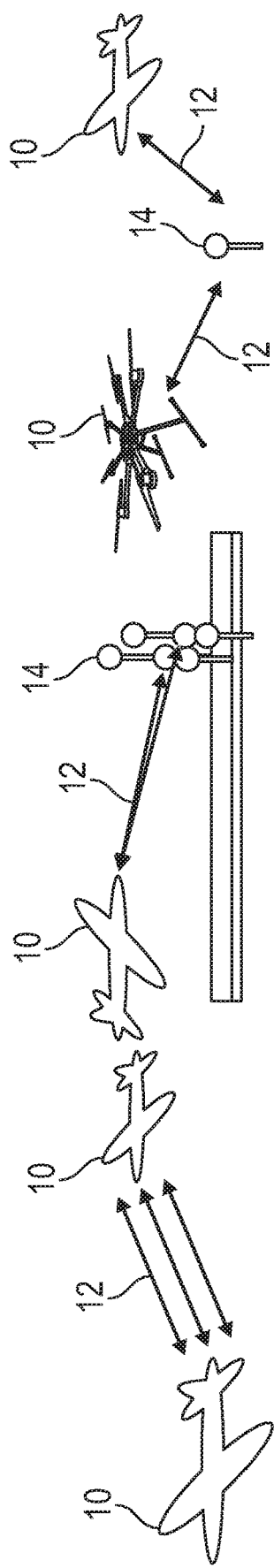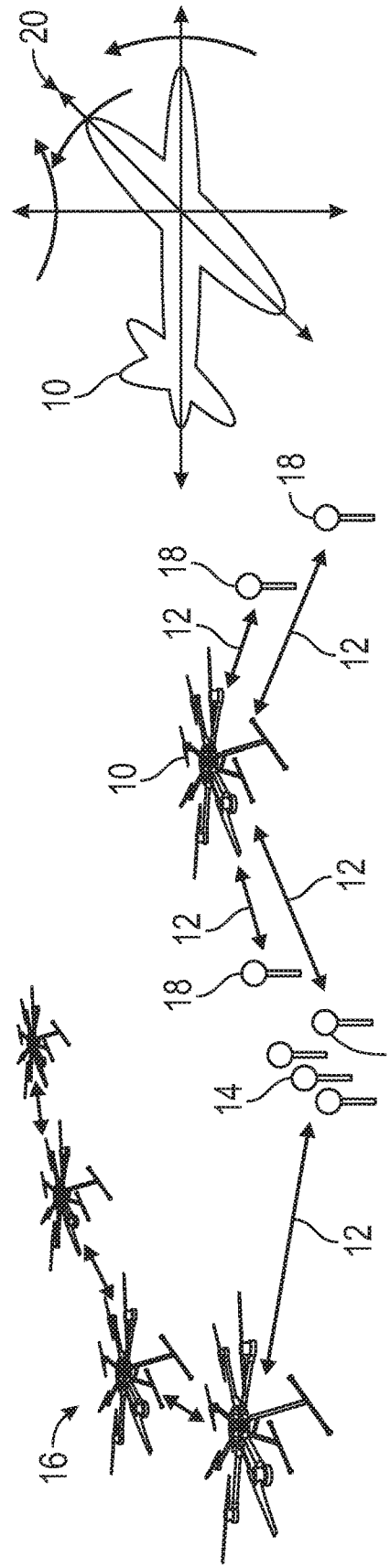

PHASE-ACCURATE VEHICLE POSITIONING SYSTEMS AND DEVICES

This application is a 35 USC 371 national phase filing of International Application No. PCT/US2018/066763, filed Dec. 20, 2018, the disclosure of which is incorporated herein by reference in its entirety.

RELATED APPLICATIONS

This application claims the benefit of U.S. Provisional Patent Application No. 62/608,500, filed Dec. 20, 2017, the disclosure of which is hereby incorporated herein by reference in its entirety.

FIELD OF THE DISCLOSURE

The present disclosure relates to relative positioning. More particularly, the disclosure relates to systems and devices which provide vehicle positional information based on an exchange of over-the-air signals.

BACKGROUND

Positioning systems are used to provide information regarding relative positions of objects. For example, vehicle positioning systems assist operators in travel and operation of air and ground vehicles. For example, aircraft positioning systems assist operators of various aircraft, particularly in critical tasks such as landing. Such positioning systems enable takeoff and landing in low visibility conditions through autonomous systems or presenting pilots with information which enables more accurate manual operation. Aircraft positioning systems are also critical for remote controlled tasks, such as drone operation.

Traditionally, vehicle positioning systems have required tradeoffs between accuracy of measurement and spectral efficiency where more accurate positioning has required higher-bandwidth signals. In addition, vehicle positioning signals have been segregated from communications signals, requiring dedicated spectrum for each.

SUMMARY

Systems and devices for phase-accurate vehicle positioning are disclosed. These systems and devices facilitate high-precision estimations of positions, orientations, velocities, and acceleration of signal nodes in a distributed network (e.g., including base stations and vehicles, such as aircraft or unmanned aerial systems (UASs)). The positioning estimations are based on time-of-arrival estimations of low-bandwidth signals and a phase-accurate distributed coherence algorithm. In some cases, the low-bandwidth signals may further facilitate joint communications and positioning estimations between the signal nodes.

Applications of the present disclosure can employ multiple-input multiple-output (MIMO) communications waveforms. MIMO phase recovery across an array of antennas can provide more accurate positioning information, including range, bearing, altitude, and orientation. In some examples, the positioning information can facilitate aircraft takeoff, landing, taxi, and formation flying. The positioning information may further facilitate automated or remote control for aircraft, automobiles, ships, and other types of vehicles.

An exemplary aspect relates to a radio frequency (RF)-based positioning device. The RF-based positioning device includes an RF receiver and a signal processor. The signal processor is operable to: receive a receive (RX) signal from the RF receiver, the RX signal comprising a carrier signal and an envelope modulation; resolve the phase of the carrier signal; and determine a position state based on the resolved phase of the carrier signal.

Another exemplary aspect relates to a vehicle positioning system. The vehicle positioning system includes a signal transceiver configured to communicate wirelessly with a first signal node and a signal processor. The signal processor is operable to: exchange first timing information with the first signal node; determine a position state based on the exchanged timing information; and estimate a position and at least one of a velocity, an acceleration, or an orientation of the vehicle relative to the first signal node based on the position state.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 1A-1F are schematic diagrams illustrating example positioning tasks for vehicles, such as aircraft, using a positioning device.

DETAILED DESCRIPTION

Figure 2:
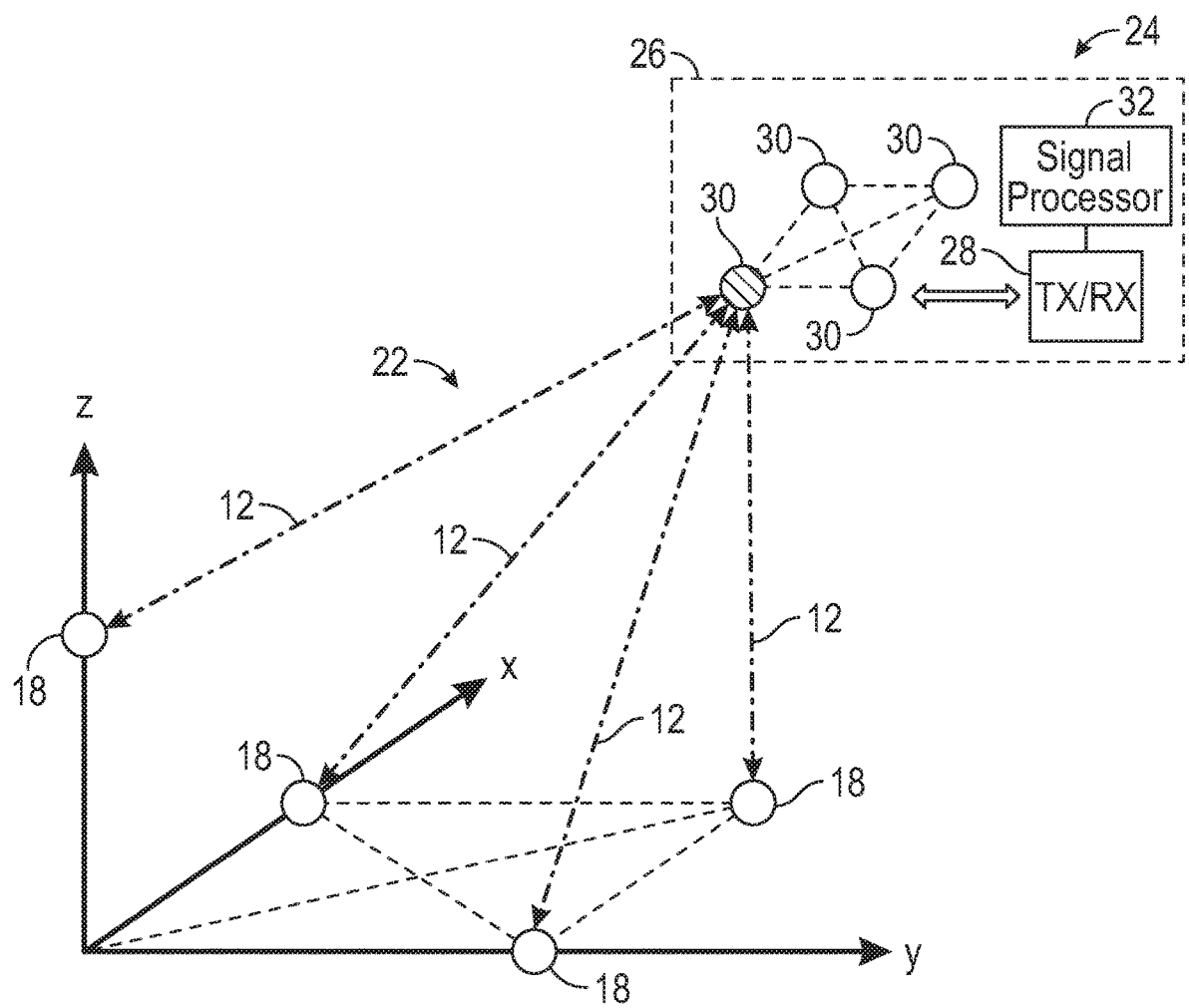
FIG. 2 is a schematic diagram of an exemplary vehicle positioning system for estimating a position state of a vehicle.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Systems and devices for phase-accurate vehicle positioning are disclosed. These systems and devices facilitate high-precision estimations of positions, orientations, velocities, and acceleration of signal nodes in a distributed network (e.g., including base stations and vehicles, such as aircraft or unmanned aerial systems (UASs)). The positioning estimations are based on time-of-arrival estimations of low-bandwidth signals and a phase-accurate distributed coherence algorithm. In some cases, the low-bandwidth signals may further facilitate joint communications and positioning estimations between the signal nodes.

Applications of the present disclosure can employ single-input single-output (SISO) or multiple-input multiple-output (MIMO) communications waveforms. MIMO phase recovery across an array of antennas can provide more accurate positioning information, including range, bearing, altitude, and orientation. In some examples, the positioning information can facilitate aircraft takeoff, landing, taxi, and formation flying. The positioning information may further facilitate automated or remote control for aircraft, automobiles, ships, and other types of vehicles.

FIGS. 1A-1F are schematic diagrams illustrating example positioning tasks for vehicles, such as aircraft, using a positioning device. The positioning device may be provided in aircraft 10, including traditional aircraft and UASs (e.g., drones). For example, the positioning device may provide the aircraft 10 with a measurement or estimate of a position state, which can include a position, orientation, velocity, and/or acceleration of the aircraft 10. In some cases, the position state can further include range, bearing, and altitude of the aircraft 10.

The position state of the aircraft 10 can be used for various tasks, such as formation flying and coordination of safe flight paths by exchanging signals 12 (e.g., radio frequency (RF) signals) between aircraft 10, as illustrated in FIG. 1A. The aircraft 10 may obtain a position state relative to a base station 14 through exchange of signals 12, as illustrated in FIGS. 1B and 1C. This may facilitate additional tasks, such as takeoff, landing, and taxiing. In some examples, a formation of drones 16 or other aircraft 10 can be coordinated through a series of exchanged signals 12 by the various drones in the formation of drones 16, as illustrated in FIG. 1D. In order to provide a more accurate and/or detailed estimation of a position state, an aircraft 10 may exchange signals 12 with multiple signal nodes 18, as illustrated in FIG. 1E. The signal nodes 18 may be multiple other aircraft 10, multiple base stations 14, or multiple antennas of another aircraft 10 or base station 14. As depicted in FIG. 1F, an aircraft 10 exchanging signals 12 with multiple signal nodes 18 may obtain an estimated position state which includes detailed orientation information 20, velocity information, acceleration information, and so on.

It should be understood that while FIGS. 1A-1F are described with respect to aircraft 10 in particular, exemplary embodiments may include other types of vehicles. For example, a positioning device for an automobile may facilitate other positioning tasks, such as parking, street navigation, and awareness of other vehicles for passing, accelerating, stopping, and so on. A positioning device for a ship can facilitate positioning tasks such as navigation, formation travel, collision avoidance, docking, and so on. Positioning devices in such vehicles may be used for assisted operation, remote control, autonomous systems, and so on.

FIG. 2 is a schematic diagram of an exemplary vehicle positioning system 22 for estimating the position state of a vehicle 24. The vehicle 24 may be an aircraft 10 as described above with respect to FIGS. 1A-1F. In other examples, the vehicle 24 can be an automobile, ship, train, or other vehicle 24, or a similar positioning system can be deployed in non-vehicular applications where positional information is needed or beneficial. The vehicle 24 includes a positioning device 26, which may be an RF-based positioning device 26. The positioning device 26 includes a signal transceiver 28. The signal transceiver 28 is coupled to one or more antennas 30, through which the signal transceiver 28 can communicate wirelessly with one or more signal nodes 18 (e.g., a first signal node, a second signal node, and so on).

In an exemplary aspect, the signal transceiver 28 includes an RF receiver and an RF transmitter for communicating wirelessly over RF signals 12. In other examples, the signal transceiver 28 can communicate over cellular or non-cellular RF frequency bands, citizens broadband radio service (CBRS) frequency bands, over microwave frequency bands, over mmWave frequency bands, over optical frequency bands, and so on. In some examples, the signal transceiver 28 exchanges signals having a narrow bandwidth, such as 10 megaHertz (MHz) or less.

As illustrated in FIG. 2, the signal transceiver 28 can couple to an array of antennas 30. Each of the antennas 30 may exchange signals 12 with each of multiple signal nodes 18. The positioning device 26 includes a signal processor 32 coupled to the signal transceiver 28 to process the signals 12 exchanged with the signal nodes 18. By processing the signals 12, the signal processor 32 can determine a position state of the vehicle 24, through which a position can be estimated based on relative distances between the vehicle 24 and each of the signal nodes 18. In addition, a velocity, acceleration, range, bearing, altitude and/or orientation of the vehicle 24 can be estimated based on the position state.

Achieving this position state on which accurate estimations can be made, given the narrow bandwidth of the signals 12, presents a challenge. For example, estimations may not be sufficiently accurate using a radar or GPS system within the bandwidth of the signals 12 (e.g., 10 MHz). Accordingly, aspects of the present disclosure describe a vehicle positioning system 22 which estimates the time-of-flight (ToF) of signals 12 traveling between an antenna 30 and each signal node 18. These estimates are transformed into relative position and orientation estimates. Thus, the accuracy of the position state (and its estimates of position, orientation, and so on) depends on the accuracy of the ToF measurements.

Figure 3A:
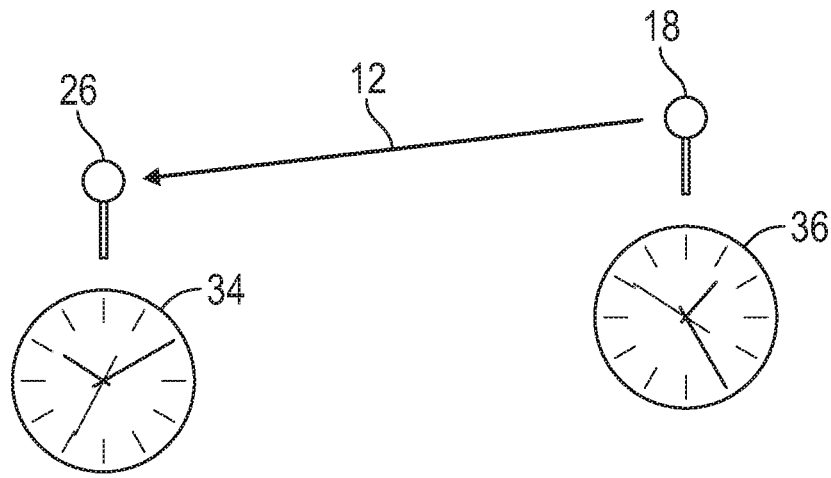
FIGS. 3A-3C are schematic diagrams of several approaches for measuring time-of-flight (ToF) of signals traveling between a positioning device and a signal node.
Figure 3B:
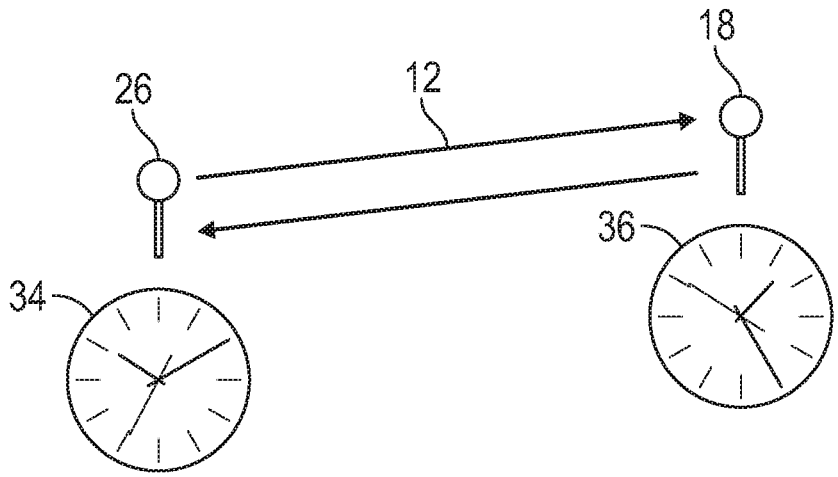
Figure 3C:
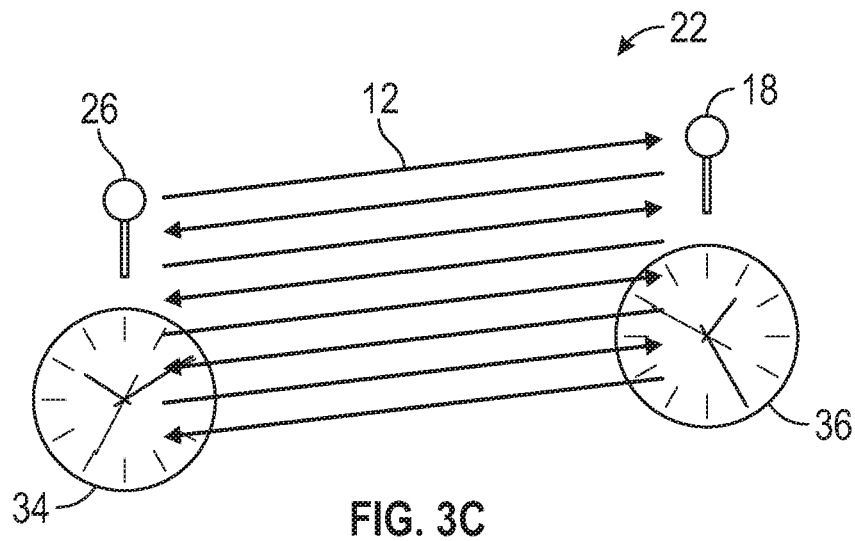

FIGS. 3A-3C depict several approaches for measuring ToF of signals 12 traveling between the positioning device 26 and a signal node 18. As illustrated in FIG. 3A, the signal node 18 could measure ToF of a single signal 12 based on a transmit time carried in the signal 12. However, this ToF measurement would only be accurate if a first clock 34 in the positioning device 26 and a second clock 36 in the signal node 18 are synchronized. In many cases, sufficient synchronization of the first clock 34 and the second clock 36 cannot be achieved. The lack of synchronization can be at least partially accounted for by transmitting a signal 12 to the signal node 18 and receiving a reflected signal 12 back, as illustrated in FIG. 3B. Under this approach, a ToF can be more accurately measured through averaging the observed ToF of the two signals 12.

However, in a positioning system 22 requiring estimations to be accurate within less than one meter, a simple reflected approach may not be sufficient. As depicted in FIG. 3C, an exemplary positioning system 22 exchanges a series of signals 12 carrying timing information in order to simultaneously synchronize the first clock 34 with the second clock 36 and provide ToF measurements.

I. Model Definition

In this regard, a timing model is defined for a synchronization algorithm, and a propagation model for estimating time-of-arrival (ToA) of the signals 12 (whereby the ToF can be derived).

A. Timing Model

In regards to the timing model, temporal variables of the exchange of timing signals 12 between the positioning device 26 and the signal node 18 can be defined as follows:

The positioning device 26 is designated as master node A and the signal node 18 as slave node B. Each node operates with an independent clock (e.g., 34, 36). A time offset T is defined as the time difference between clock A and clock B. A positive T denotes that clock B displays an earlier time than clock A. A ToF $\tau$ is defined as the time required for a signal to propagate between the two nodes.

Timestamps for transmit and receive events are measured with respect to the clock at which the event occurs. Event timestamps are denoted $t_{(\cdot),(\cdot)}$; the first subscript indicates whether the event occurred at node A or B, and the second subscript indicates if it was a transmit (TX) or receive (RX) event. For a transmission from node A to node B, node B will receive the signal at time:

$$t_{B,RX} = t_{A,TX} + \tau - T \qquad \text{(Equation 1)}$$

For a transmission from node B to node A, node A will receive the signal at time:

$$t_{A,RX} = t_{B,TX} + \tau + T \qquad \text{(Equation 2)}$$

This implicitly assumes that r and T do not change significantly while a signal travels between nodes. In an exemplary aspect of the present disclosure, the positioning system 22 includes well-toleranced oscillators and platform velocities, such that this is a reasonable assumption.

A timing exchange is defined as a transmit (TX) event and its corresponding receive (RX) event. The frame length l is defined as the time between two consecutive timing exchanges. These frames, and the instantaneous values of the time variables, can be indexed by n, e.g., $t_{(\cdot),TX}^{(n)}$, $t_{(\cdot),RX}^{(n)}$, $T^{(n)}$, $\tau^{(n)}$, etc. The first order derivatives $\dot{T}$ and $\dot{\tau}$ can be estimated by tracking the differences in these instantaneous values between frames.

B. Propagation Model

The propagation characteristics of a signal transmitted between two nodes is modeled as follows. Consider a complex baseband signal x(t). This signal is up-converted to a carrier frequency $f_c$, transmitted between nodes, and down-converted at the receiver to produce a received complex baseband signal z(t).

The transmitter and receiver operate with imperfect and misaligned clocks, which distort frequency synthesis at both the transmitter and receiver. A misalignment factor $\zeta_{(\cdot)}$ is defined to represent the net impact of imperfect frequency knowledge, whose subscript denotes which radio received the signal. This factor can be modeled in greater detail as a function of clock parameters and the temporal variables discussed previously.

In a standard line of sight channel in additive white Gaussian noise, the received signal is modeled as:

$$z(t) = |a|x(t-\tilde{\tau})e^{-j2\pi[(f_c+\zeta_{(\cdot)})\tau+\zeta_{(\cdot)}t]} + n(t) \qquad \text{(Equation 3)}$$

in which the channel attenuation a is defined as:

$$a = \sqrt{\frac{\lambda^2 G_{TX} G_{RX}}{(4\pi R)^2}} \qquad \text{(Equation 4)}$$

where n is complex, circularly-symmetric Gaussian noise, and $\tilde{\tau} = \tau \pm T$ depending on whether node A or node B received the signal, respectively.

This warrants the following notes:

1) This model implicitly assumes that several layers of internal phase calibration have been performed at each node. Without this calibration, additional phase terms are present in the exponent.

2) In the case of perfectly aligned clocks, $\zeta_{(\cdot)} = 0$, and this model collapses to the standard line of sight propagation result.

3) $\zeta_{(\cdot)}$ can be estimated directly by the inclusion of pilot sequences at the beginning and end of the waveform. Given the system parameters, $\zeta_{(\cdot)}$ can be estimated to within several Hz.

II. ToA Estimation

Two ToA estimation techniques are defined, and their Cramér-Rao lower bounds on performance described below. These bounds can be compared to simulated performance results.

A. Formulation

Two estimation techniques can be considered: the first correlates the received signal with a known reference without considering the phase terms, while the second compensates for the phase terms in Equation 3 above.

Consider the "incoherent" cost function:

$$J_m(\tau') = |\int dt z(t) x^*(t-\tau')|^2 \quad \text{(Equation 5)}$$

$\tau'$ is a delay hypothesis relative to the transmit time $t_{(\cdot),RX}$, which is shared via the communications link. By inspection, this cost function is maximized for $\tau' \approx \tau$. Thus the delay estimator, and consequently the ToA estimator, can be defined as:

$$\hat{t}_{m,(\cdot),RX} = t_{(\cdot),TX} + \hat{\tilde{t}}_m; \quad \hat{\tilde{t}}_m = \arg\max_{\nu}\{J_m(\tau')\} \quad \text{(Equation 6)}$$

Now consider the "coherent" cost function:

$$J_p(\tau') = \int dt Z(t) x^*(t-\tau') e^{j2\pi(f_c + \hat{\zeta}_{(\cdot)})\tau'} \quad \text{(Equation 7)}$$

Where $\hat{\zeta}_{(\cdot)}$ is an independent estimate of $\zeta_{(\cdot)}$ generated by another mechanism. This correlation is similar to Equation 5 but compensated by the expected phase shift given a delay $\tau^1$. This leverages the phase information in the received signal to potentially improve the quality of the delay estimate. The resulting estimators can be likewise defined as:

$$\hat{t}_{p,(\cdot),RX} = t_{(\cdot),TX} + \hat{\tilde{t}}_p; \quad \hat{\tilde{t}}_p = \arg\max_{\nu}\{J_p(\tau')\} \quad \text{(Equation 8)}$$

In a real system, neither $z(t)$ nor $x(t)$ may be known exactly, but may be approximated by the sampled signals $z[n]$ and $x[n]$. In this case, estimating the ToA is a maximization with respect to the discrete cost function:

$$J_d[k'] = \Sigma z[n] x^*[n-k'] e^{j2\pi(f_c + \hat{\zeta}_{(\cdot)})k_s f_s^{-1}} \quad \text{(Equation 9)}$$

where $f_s$ is the sampling frequency and $k'$ is the sampled version of $\tau'$. The ToA estimator is then defined as:

$$\hat{t}_{d,(\cdot),RX} = t_{(\cdot),TX} + \hat{\tilde{t}}_d; \quad \hat{\tilde{t}}_d = \arg\max_{k'}\{J_d(k')\} \cdot f_s^{-1} \quad \text{(Equation 10)}$$

Evaluating the maximum of this discrete correlation changes the nature of this estimation. The resolution of the test points $k'$ is proportional to the sampling frequency $f_s$, but the phase of the true cost function rotates at a frequency proportional to the carrier frequency $f_c$. For narrowband systems, $f_s \ll f_c$, and in this system in particular $f_c$ is 100 times greater than $f_s$. As a result, the phase of the cost function rotates 100 times between each test point $k'$, so the phase information is ambiguous (e.g., two different $\tau'$ values separated by 1 cycle have the same phase), but in the discrete cost function they would fall into the same $k'$ bin. Consequently, the phase information cannot be used to distinguish which $\tau'$ is true unless they are disambiguated.

One approach to overcoming these ambiguities is to define a denser sampling lattice over $k'$, such that the cost function is evaluated every carrier cycle. At this higher resolution, the binning of $k'$ is sufficiently narrow that only one $\tau'$ falls into each bin, which disambiguates the phase information. In this case, there will still be a slight phase difference as a result of the small difference between the test point, $k' f_s^{-1}$, and the true delay, $\tau$, which can be used to improve the estimate, such that:

$$\hat{t}_{d,(\cdot),RX} = t_{(\cdot),TX} + \hat{\tilde{t}}_d - \frac{\arg(J_d(k'_{max}))}{2\pi f_c} \quad \text{(Equation 11)}$$

This approach can be referred to as "one-shot refinement." The performance of this approach may be limited by how well the up-sampled versions of $z(t)$ and $x(t)$ are modeled. These signals are usually generated at some small multiple of the sampling frequency $f_s$, so imperfections in modeling them at the carrier frequency $f_c$ can distort the correlation and limit estimator performance.

B. Cramér-Rao Lower Bound

The Cramér-Rao Lower Bounds for Equations 6 and 8 are as follows:

$$\sigma_m^2 \le (8\pi^2 \times \text{ISNR} \times B_{rms}^2)^{-1} \quad \text{(Equation 12)}$$

$$\sigma_p^2 \le (8\pi^2 \times \text{ISNR} \times \langle f_c^2 \rangle)^{-1} \quad \text{(Equation 13)}$$

where $\sigma^2$ is the estimator variance, ISNR is the integrated signal to noise ratio (SNR), $B_{rms}$ is the root mean square (RMS) bandwidth, and $\langle f_c^2 \rangle$ is the mean square frequency.

These bounds represent the best possible estimator variance under their respective assumed models. If the data actually follows the higher-fidelity model of Equation 3, these estimators will experience a performance degradation as a result of model misspecification. The simulated performance of the discrete estimators in Equations 10 and 11 is compared to these two bounds in FIG. 4A. The penalty incurred by model misspecification manifests as the separation between the actual performance curves and the Cramér-Rao Lower Bounds.

Figure 4A:
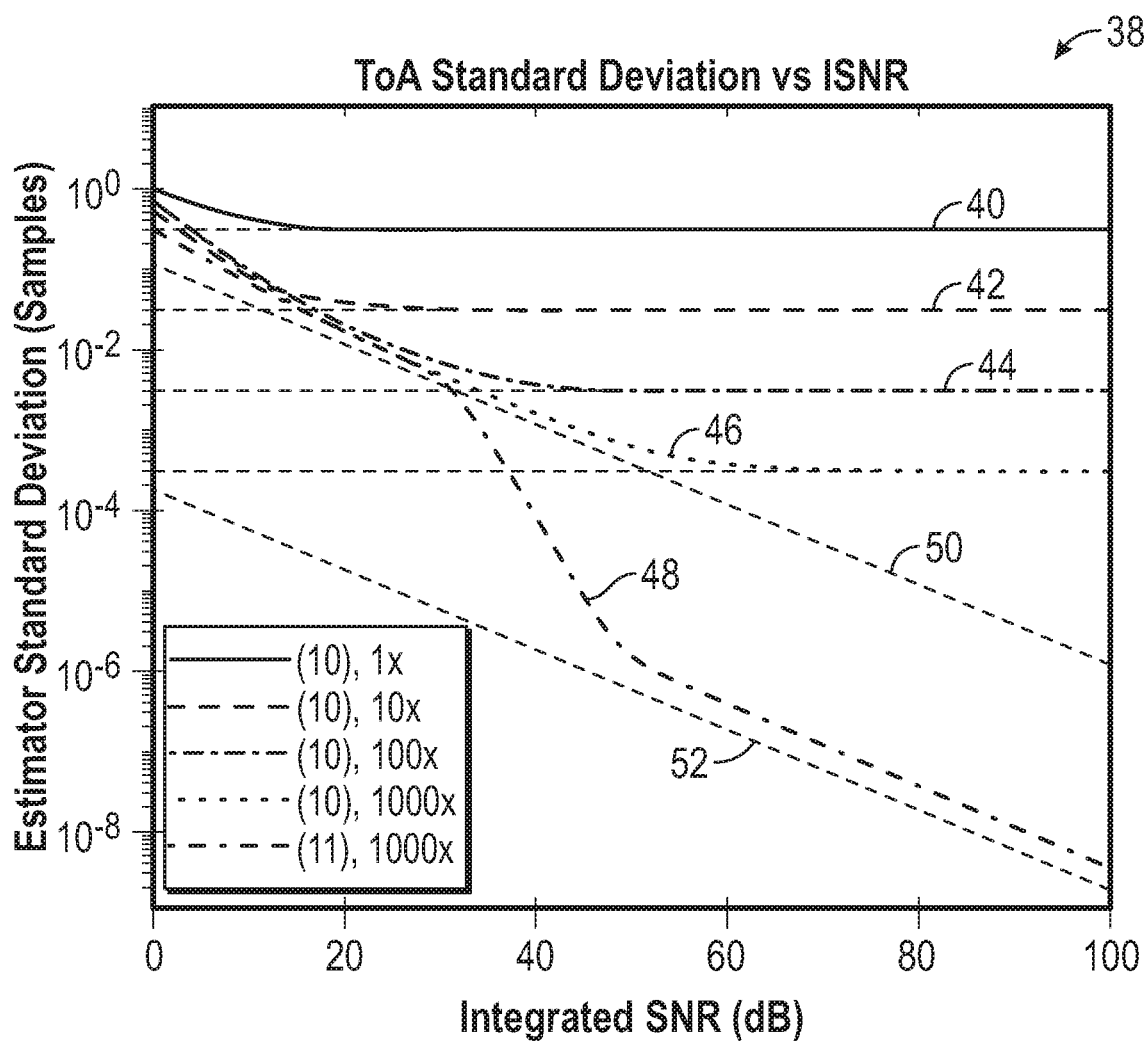
FIG. 4A is a graphical depiction of simulated time-of-arrival (ToA) estimator standard deviation as a function of integrated signal to noise ratio (ISNR).

FIG. 4A is a graphical depiction of simulated ToA estimator standard deviation 38 as a function of ISNR. The standard deviation 38 is normalized to the sampling rate, with $f_s = 10$ MHz and $f = 1$ GigaHertz (GHz). A first curve 40 corresponds to the discrete estimator of Equation 10 at a resolution of 1× (oversampled with respect to the sampling frequency $f_s$). A second curve 42 corresponds to the discrete estimator of Equation 10 at a resolution of 10×. A third curve 44 corresponds to the discrete estimator of Equation 10 at a resolution of 100×. A fourth curve 46 corresponds to the discrete estimator of Equation 10 at a resolution of 1000×. A fifth curve 48 corresponds to the discrete estimator of Equation 11 (e.g., with the additional phase term) at a resolution of 1000×. The Cramér-Rao Lower Bounds of Equations 12 and 13 are plotted as slopes 50, 52.

As illustrated in FIG. 4A, without the phase adjustment, the discrete estimator of Equation 10 plateaus once it reaches the intrinsic resolution of the test points. The phase information is ambiguous until the difference between adjacent test points is less than a carrier cycle—in this case 1=100 of a sample, defined as a horizontal line corresponding to the third curve 44—at which point Equation 11 transitions to the lower performance bound.

Figure 4B:
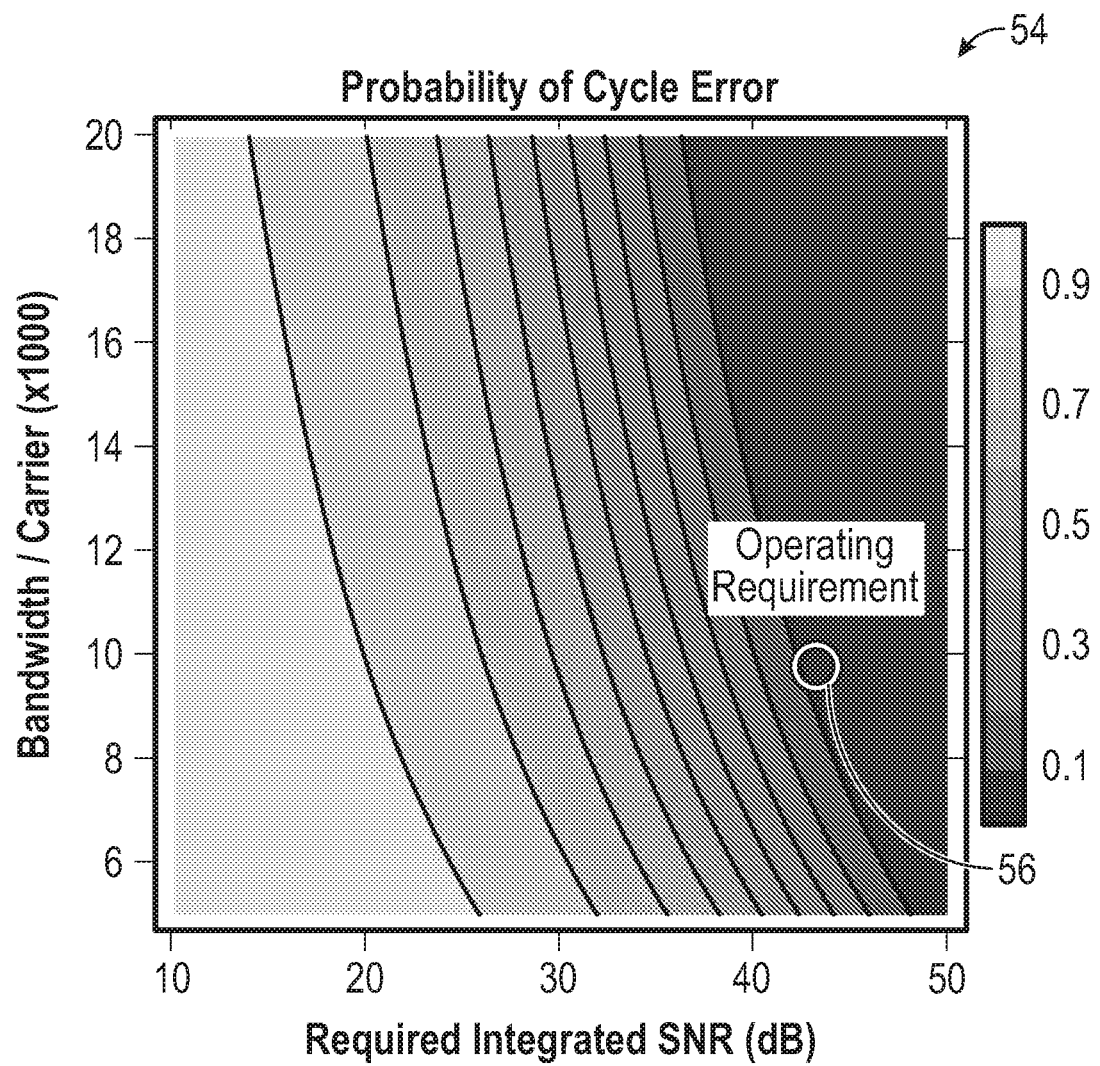
FIG. 4B is a graphical depiction of probability of cycle errors over a given bandwidth, illustrating a required ISNR to resolve a signal.

FIG. 4B is a graphical depiction of probability of cycle errors 54 over a given bandwidth, illustrating a required ISNR to resolve a signal. If the ToA estimator algorithm of the positioning system 22 of FIG. 2 is unable to overcome ambiguities in the phase, the estimator may experience a cycle error, rendering decreasing the accuracy of the estimator. This probability must therefore be kept low, which consequently constrains most of the system parameters. In an exemplary aspect, an operating requirement 56 of the system may require a cycle error probability of 0.1 with a bandwidth/carrier ratio of 10,000. This may further require an ISNR of 44 decibels (dB).

Figure 5:
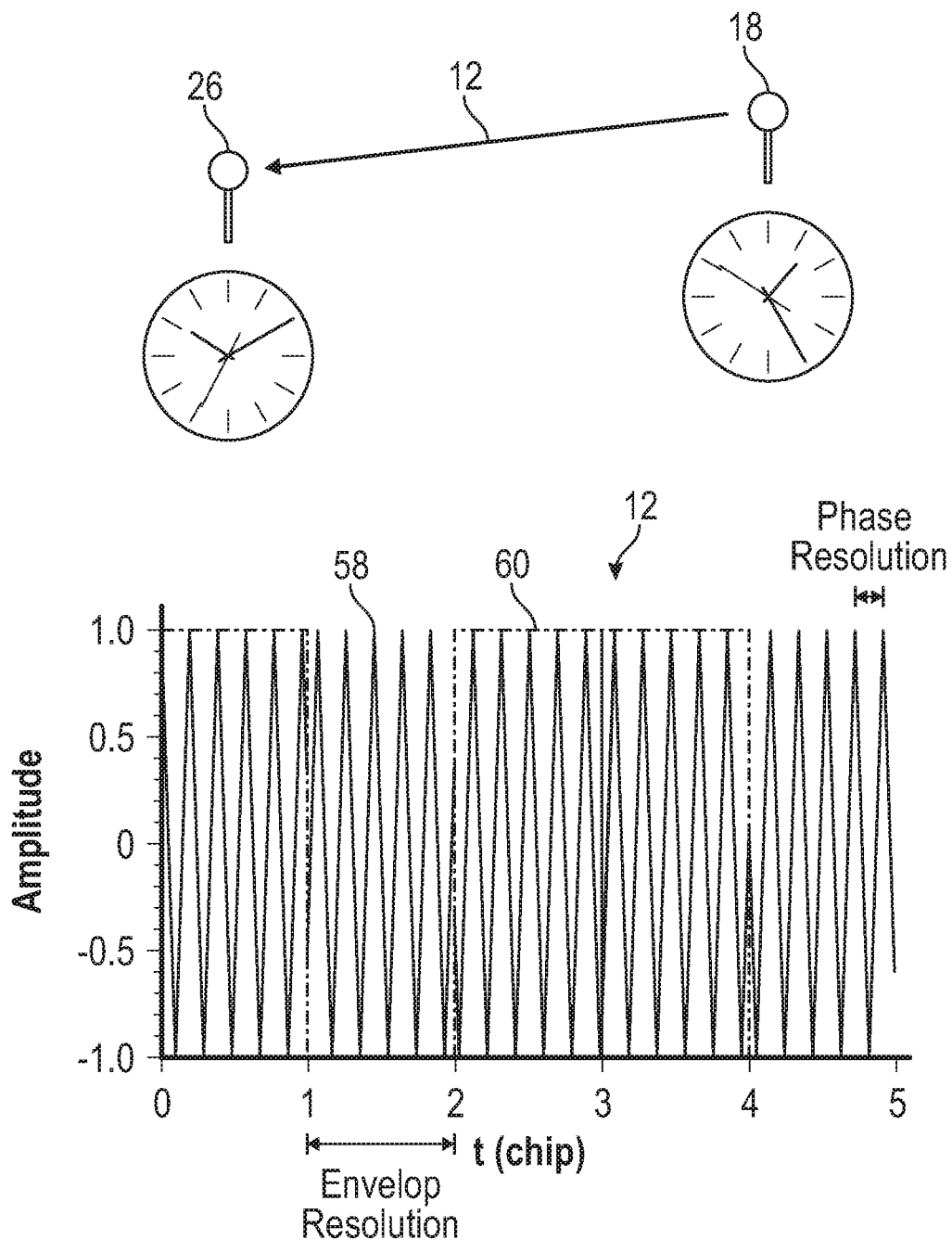
FIG. 5 is a graphical depiction of an exemplary modulated carrier signal, illustrating advantages of resolving the phase of the carrier signal.

FIG. 5 is a graphical depiction of an exemplary modulated carrier signal 12, illustrating advantages of resolving the phase of the carrier signal. In an exemplary aspect, the positioning device 26 receives the signal 12, which includes a carrier signal 58 and an envelope modulation 60. Under some approaches to timing synchronization, the positioning device 26 may only resolve the envelope modulation 60, and is therefore limited in its ability to accurately estimate ToF of the signal 12. However, examples of the positioning device 26 can accurately resolve the phase of the carrier signal 58, and therefore have a considerably higher accuracy in estimating ToF of the signal 12 and synchronizing with the signal node 18.

III. Distributed Phase Coherence Algorithm

In an exemplary aspect, the positioning system 22 of FIG. 2 deploys a synchronization algorithm that uses phase-accurate ToA estimates to estimate ToF between nodes (e.g., the positioning device 26 of FIG. 3C as master node A and the signal node 18 as slave node B) The synchronization algorithm may simultaneously synchronize the first clock 34 and the second clock 36 of the nodes. The nodes alternate transmitting and receiving timing information over signals 12, which drives estimators of the ToF $\tau$, and the time offset T between the nodes. The first order derivatives $\dot{\tau}$ and $\dot{T}$ are tracked across transmission cycles and used to improve these estimates. Further tracking and filtering techniques can be layered over this algorithm to further improve the estimations.

The first stage of the synchronization algorithm imposes several assumptions that are relaxed in later stages as more information is available. Each node alternates between transmitting and receiving timing information. After a full cycle, the receiving node has enough information to estimate the ToF $\tau$ and time offset T for the current frame and the previous frame. For a cycle A→B→A, the current frame can be labeled as n and the previous frame as n−1. Using Equations 1 and 2, the sum $\tau^{(n)}+\tau^{(n-1)}$ may be expressed as:

$$\tau^{(n)}+\tau^{(n-1)}=\gamma^{(n)}+T^{(n-1)}-T^{(n)} \quad \text{(Equation 14)}$$

$$\gamma^{(n)}=t_{B,RX}^{(n-1)}-t_{A,TX}^{(n-1)}+t_{A,RX}^{(n)}-t_{B,TX}^{(n)} \quad \text{(Equation 15)}$$

When node A receives a response in frame n, the sum ToF $\gamma$ is computed using the shared timestamps $t_{B,RX}^{(n-1)}$ and $t_{B,TX}^{(n)}$, and the local timestamps $t_{A,TX}^{(n-1)}$ and $t_{A,RX}^{(n)}$. The first stage assumes that during the cycle A→B→A, $\tau$ and T do not change. Under these assumptions, Equation 14 collapses to:

$$\tau^{(n)} = \tau^{(n-1)} = \frac{\gamma^{(n)}}{2} \quad \text{(Equation 16)}$$

$T^{(n)}$ and $T^{(n-1)}$ may then be estimated using Equation 1 and Equation 2.

A. Velocity Compensation

The second stage of the algorithm relaxes the assumption that $T^{(n)}=\tau^{(n-1)}$ and compensates Equation 14 with estimates of t and the frame durations l. These may be estimated directly by computing the ToF difference across cycles, or by a more sophisticated tracking filter. The ToF at frame n can be modeled as:

$$\tau^{(n)}=\tau^{(n-1)}+\dot{\tau}^{(n-1)}l^{(n-1)} \quad \text{(Equation 17)}$$

Substituting Equation 17 into Equation 14 and solving for $\tau^{(n)}$:

$$\tau^{(n-1)} = \frac{\gamma^{(n)} - \dot{\tau}^{(n-1)}l^{(n-1)}}{2} \quad \text{(Equation 18)}$$

$$\tau^{(n)} = \frac{\gamma^{(n)} + \dot{\tau}^{(n-1)}l^{(n-1)}}{2} \quad \text{(Equation 19)}$$

$T^{(n)}$ and $T^{(n-1)}$ may then be re-estimated using Equation 1 and Equation 2.

B. Frequency Compensation (FVC-NTP)

The third stage of the algorithm relaxes the assumption that $T^{(n)}=T^{(n-1)}$ and compensates Equations 18 and 19 with estimates of $\dot{T}$, which may likewise be estimated directly or provided by a tracking filter. The time offset T at frame n can be modeled as:

$$T^{(n)}=T^{(n-1)}+\dot{T}^{(n-1)}l^{(n-1)} \quad \text{(Equation 20)}$$

Substituting Equation 17 and Equation 20 into Equation 14 and solving for $\tau^{(n)}$:

$$\tau^{(n-1)} = \frac{\gamma^{(n)} - \dot{\tau}^{(n-1)}l^{(n-1)} - \dot{T}^{(n-1)}l^{(n-1)}}{2} \quad \text{(Equation 21)}$$

$$\tau^{(n)} = \frac{\gamma^{(n)} + \dot{\tau}^{(n-1)}l^{(n-1)} - \dot{T}^{(n-1)}l^{(n-1)}}{2} \quad \text{(Equation 22)}$$

$T^{(n)}$ and $T^{(n-1)}$ may then be re-estimated using Equation 1 and Equation 2. A similar set of equations may be generated by the same arguments for a cycle from B→A→B.

Figure 6:
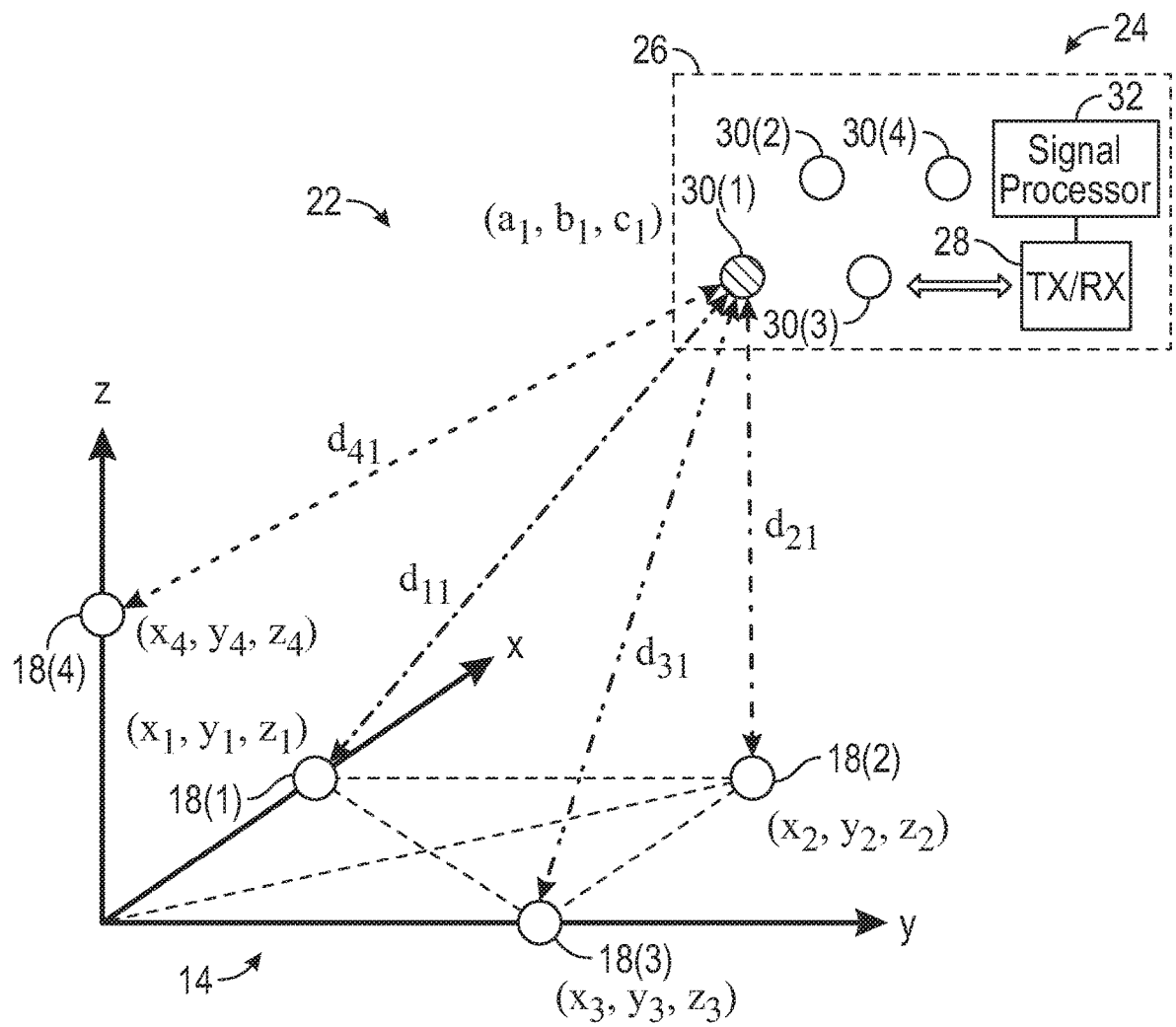
FIG. 6 is a schematic diagram of the exemplary vehicle positioning system of FIG. 2, illustrating estimation of a position state based on exchanging timing signals between an array of antennas and a base station.

FIG. 6 is a schematic diagram of the exemplary vehicle positioning system 22 of FIG. 2, illustrating estimation of a position state based on exchanging timing signals between an array of antennas 30(1)-30(4) and a base station 14. In the example depicted in FIG. 6, the base station 14 includes four antennas, indicated by a first signal node 18(1) at ($x_1$, $y_1$, $z_1$), a second signal node 18(2) at ($x_2$, $y_2$, $z_2$), a third signal node 18(3) at ($x_3$, $y_3$, $z_3$), and a fourth signal node 18(4) at ($x_4$, $y_4$, $z_4$). The signal processor 32 of the positioning device 26 in the vehicle 24 (e.g., an aircraft 10, such as a UAS as depicted in FIGS. 1A-1F) deploys the synchronization and ToF estimation algorithm described above to determine, measure, and/or estimate a position state of the vehicle 24. With the position state, the signal processor 32 can estimate relative distances $d_{11}$, $d_{21}$, $d_{31}$, and $d_{41}$ between a first antenna 30(1) at ($a_1$, $b_1$, $c_1$) and the signal nodes 18(1), 18(2), 18(3), and 18(4) of the base station 14, respectively based on timing signals exchanged through the transceiver 28. Similar distances can be determined between each of the other antennas 30(2)-30(4) of the positioning device 26 and the signal nodes 18(1), 18(2), 18(3), and 18(4) of the base station 14. With the relative distances of each antenna 30(1)-30(4) estimated, additional positional information can be determined, such as an orientation of the vehicle 24.

In an exemplary aspect, the vehicle positioning system 22 simultaneously performs two tasks: network communications and relative positioning. Both tasks can be performed with a single, co-use signal 12 (such as depicted in FIG. 2 and described further below with respect to FIG. 9) that contains a communications payload, navigation sequences, and pilot sequences. The communications payload is used to transfer data between nodes, including the timing information required by the synchronization algorithm. The navigation sequences provide a reference signal to drive the ToA estimators. The piloting sequences provide reference signals to align the communications processing chain and estimate frequency offsets.

When two radio platforms (e.g., the positioning device 26 and the base station 14) interact, $n_{TX}$ antennas on a transmitting platform communicate with $n_{RX}$ antennas on a receiving platform, forming $M=n_{TX} \times n_{RX}$ links (e.g., via MIMO, illustrated as 4×4 MIMO in FIG. 6). The receiving platform (e.g., the transceiver 28 and/or the signal processor 32 of the positioning device 26) decodes the communications payload, then estimates the ToA for each link and updates the synchronization algorithm. This yields a ToF estimate $\hat{\tau}$ for each link, which may be converted to distance estimates (e.g., $d_{11}$, $d_{21}$, $d_{31}$, and $d_{41}$) and used to trilaterate the relative position to the other node (e.g., the signal nodes 18(1)-18(4) of the base station 14). If the antenna placement on each radio platform is known, a system of equations can be solved to estimate the position of each antenna (e.g., the antennas 30(1)-30(4) and the signal nodes 18(1)-18(4)). These position estimates then drive a relative orientation estimator, and can further drive an estimator of velocity, acceleration, and other positional information over time (e.g., range, bearing, altitude, and so on).

Using the ToF estimation and synchronization algorithm described above, the vehicle positioning system 22 can achieve higher accuracy than previous approaches. In this regard, an exemplary vehicle positioning system 22 operating at a 915 MHz carrier frequency with a 10 MHz bandwidth has achieved better than 30 cm accuracy in the distance estimates $d_n$, $d_{21}$, $d_{31}$, $d_{41}$. Another exemplary vehicle positioning system 22 has achieved greater than 1 cm accuracy in the distance estimates $d_{11}$, $d_{21}$, $d_{31}$, $d_{41}$ with similar signal constraints. Up to 1 mm of accuracy may further be achieved, depending on wavelength of the carrier frequency.

Figure 7:
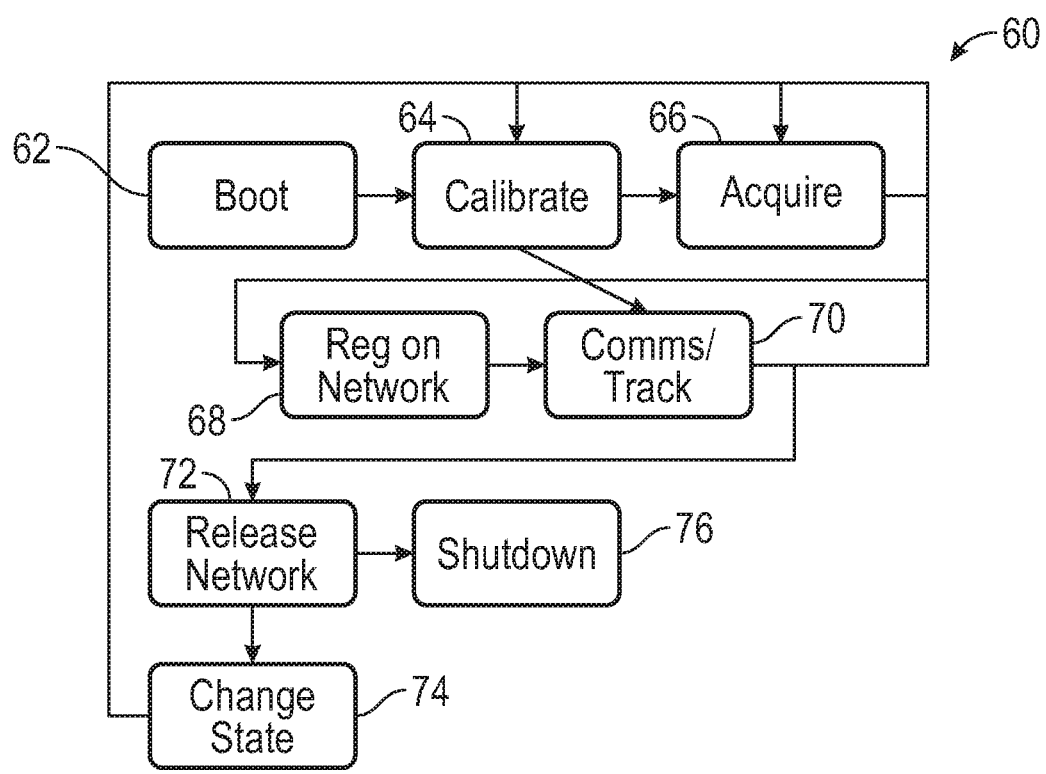
FIG. 7 depicts a block diagram of a state machine for an exemplary communications protocol.

FIG. 7 depicts a block diagram of a state machine 60 for an exemplary communications protocol for estimating the position state as described with respect to FIGS. 1A-6. In this regard, after initial booting 62 and calibration 64, when a target enters the network, the radio moves through an acquisition phase 66 and registration phase 68. These radios then communicate and track 70 each other while updating their calibrations (e.g., using the ToF estimation and synchronization algorithm described above). When these functions are concluded, the radio releases from the network 72 and may either change states 74 and resume operation with other radios or shut down 76.

The proposed system simultaneously communicates with and tracks another radio system in the environment. This tracking includes a position state, which includes a large state space composed of estimates of target position, velocity, and acceleration; orientation and orientation rates; local oscillator characteristics; and accelerometer and gyroscope bias. Exemplary components of the position state are detailed in Table 1 below.

Several measurement techniques can be employed to observe various aspects of the position state. MIMO ToF estimations allow observation of target position, and across multiple signal exchanges allow observation of the velocity and acceleration. These position estimates may be used to deduce target orientation given priors on the distribution of antennas on the target. The first and second derivatives of this orientation may likewise be deduced with data from multiple signal exchanges. A derivative of recovered phase information in the position state can be used to correct for frequency offsets and frequency drifts in the position state. The local oscillator offsets and rates are computed and tracked using the synchronization algorithm described above. Additional components of the position state may be measured with appropriate sensors. Under certain conditions, GPS data may be used to confirm estimations of the position state.

TABLE 1

System State Components

| Aspect | Components | Summary |
|---|---|---|
| Position | 3 | x, y, z |
| Velocity | 3 | $\dot{x}$, $\dot{y}$, $\dot{z}$ |
| Acceleration | 3 | $\ddot{x}$, $\ddot{y}$, $\ddot{z}$ |
| Orientation | 3 | Roll (β), Pitch (γ), Yaw (α) |
| Orientation Rate | 3 | $\dot{\beta}$, $\dot{\gamma}$, $\dot{\alpha}$ |
| Orientation Acceleration | 3 | $\ddot{\beta}$, $\ddot{\gamma}$, $\ddot{\alpha}$ |
| LO Phase Offset | 1 | φ |
| LO Frequency Offset | 1 | Δf |
| LO Frequency Rate | 1 | $\Delta\dot{f}$ |
| Accelerometer Bias | 3 | a |
| Gyro Bias | 3 | g |

Figure 8:
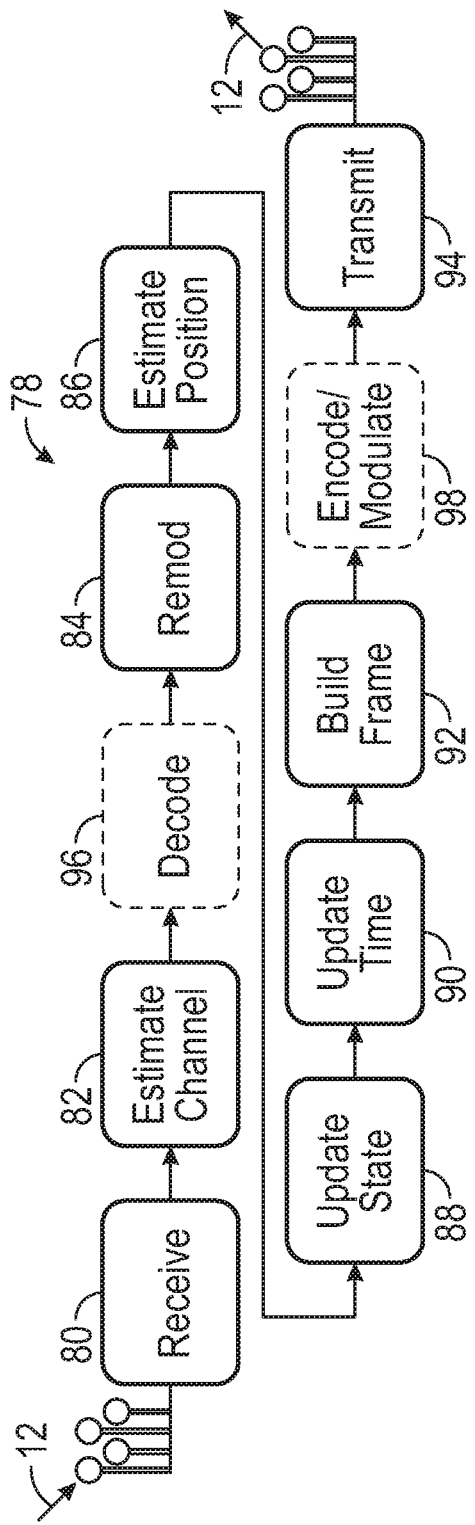
FIG. 8 depicts a block diagram of an exemplary radio protocol that simultaneously performs communications and positioning tasks.

FIG. 8 depicts a block diagram of an exemplary radio protocol 78 that simultaneously performs communications and positioning tasks. The positioning tasks include precise timing estimates and timing signal 12 exchanges between radio platforms (e.g., the positioning device 26 and base station 14 of FIGS. 2 and 6) in the vehicle positioning system 22 and precise ToF estimates. In an exemplary aspect, the radio protocol 78 begins with receiving a receive (RX) signal 12 from another node (e.g., the base station 14) (block 80). This is accomplished by first estimating the communications portion of the waveform (block 82), then reconstructing it (block 84, which may include oversampling at 1000×) to build a better channel estimate for the position estimation (block 86). Once the position has been estimated, the position state and time synchronization are updated (blocks 88 and 90). The frame of a transmit (TX) signal 12 is then built (block 92) and transmitted to the other node 14 (block 94).

In some examples, the RX signal 12 and/or the TX signal 12 can be encrypted to improve security of the radio protocol 78. In such cases, the radio protocol 78 may also include a decoding the RX signal 12 (block 96) and encoding the TX signal 12 (block 98). The primary security threat of concern for the radio protocol 78 can be an adversary providing false information to the system with intent to manipulate the path of vehicles in the vehicle positioning system 22. This can be counteracted by avoiding reliance on less secure systems such as GPS, and instead developing a robust positioning approach. This includes dynamic encryption with dynamic key distribution and time-limited keys, which prevent an adversary from creating false messages that appear legitimate.

Figure 9:
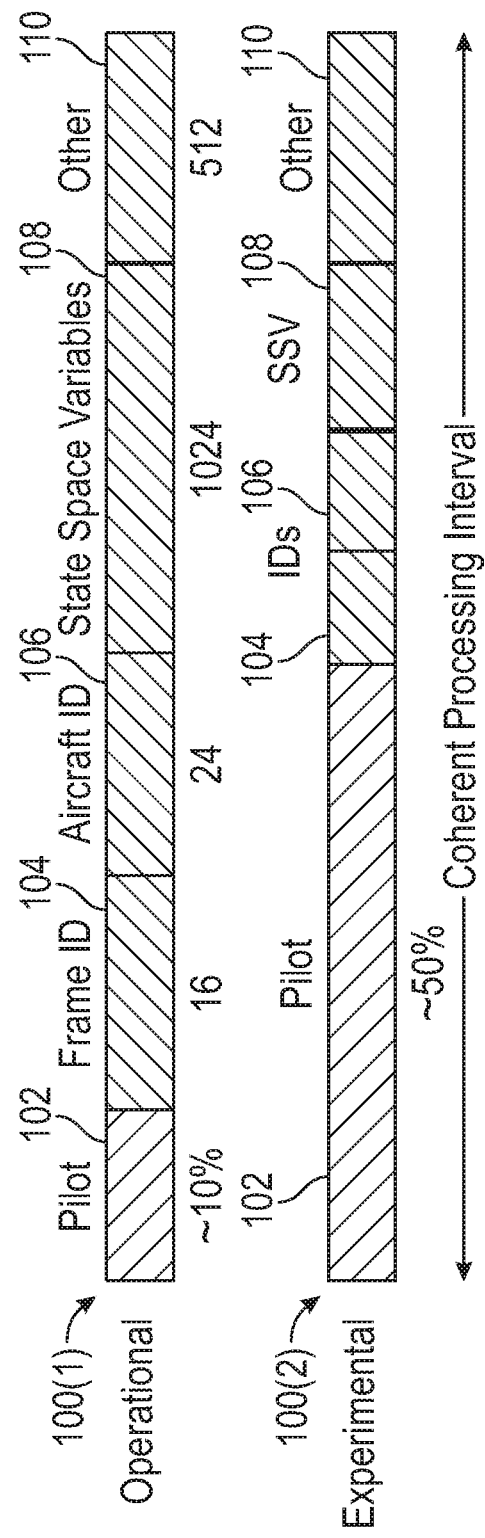
FIG. 9 is a block diagram of a data structure for communications packets, illustrating representative size allocations for data segments.

FIG. 9 is a block diagram of a data structure for communications packets 100(1), 100(2), illustrating representative size allocations for data segments. Within each communications packet 100(1), 100(2), each radio in the network will communicate: a piloting sequence 102 to provide reference signals to align the communications processing chain and estimate frequency offsets; a frame ID 104 which specifies the chosen waveform parameters; an aircraft ID 106 which specifies characteristics such as size, shape, cross-section, and radio distribution; and estimates of state space variables 108. Space is also reserved for other miscellaneous payloads 110. The size allocations for these segments are flexible, such as illustrated with respect to a first communications packet 100(1) and a second communications packet 100(2).

Figure 10:
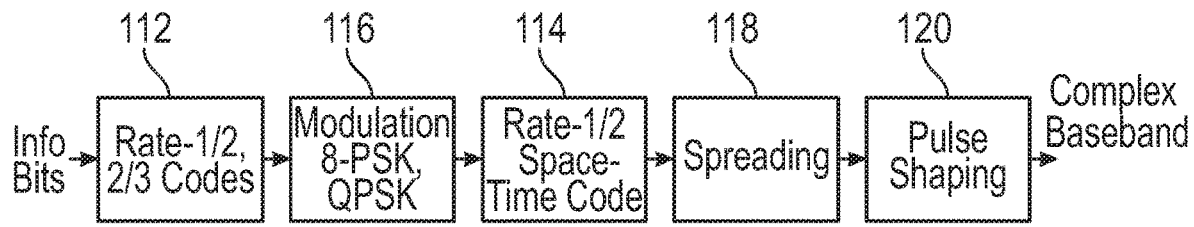
FIG. 10 is a flow diagram of an exemplary process for encoding, modulating, and shaping a mixed communications and timing signal.

FIG. 10 is a flow diagram of an exemplary process for encoding, modulating, and shaping a mixed communications and timing signal. The coding approach may be broken into three stages: a simple block code, a spatial redundancy spread code, and MIMO processing. The MIMO processing is decoupled from the encoder in this approach for simplicity. A first encoder 112 is a binary, SISO, rate 1/2 or 2/3 space-time block code. Several options may be used for this encoder, including convolutional plus Reed-Solomon (RS), turbo codes, low-density parity-check (LDPC) codes, and Field Programmable Gate Array (FPGA). A second encoder 114 is a temporal redundancy code that adjusts the coding rate to achieve the desired spectral efficiency.

Chosen modulation schemes 116 include Quadrature Phase Shift Keying (QPSK) and Eight-Phase Shift Keying (8-PSK) modulations with a constant modulus envelope constraint. After spreading 118, a root-raised cosine filter is used to shape pulses 120. The system may alternate between these two modulations to achieve the appropriate spectral efficiency and data rate requirements.

Figure 11:
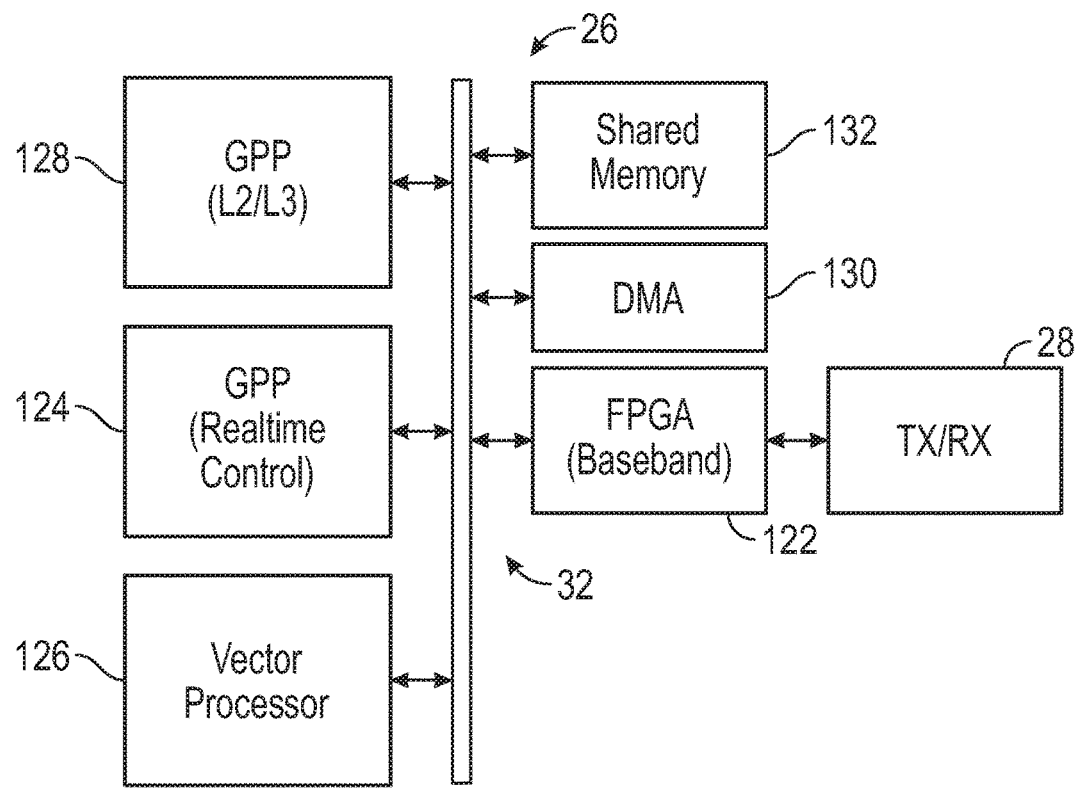
FIG. 11 is a block diagram of an exemplary positioning device according to aspects of the present disclosure.

FIG. 11 is a block diagram of an exemplary positioning device 26 according to aspects of the present disclosure. The positioning device 26 includes a signal processor 32 coupled to a transceiver 28, which may include an RF transmitter configured to transmit TX signals and an RF receiver configured to receive RX signals, each of which may include timing and communication data. The signal processor 32 includes four major function blocks: an FPGA 122, a real-time General Purpose Processor (GPP) 124, a vector processor 126, and another GPP 128. The signal processor 32 may also include a direct memory access (DMA) processor 130 and shared memory 132.

It should be understood that the above systems and methods may be incorporated along with additional position and/or orientation systems to provide additional layers of information. For example, GPS radar, camera, and additional information systems may be used by vehicles and/or base stations to enable improved guidance and control systems.

The various illustrative logical blocks, modules, and circuits described in connection with the embodiments disclosed herein may be implemented or performed with a processor, a Digital Signal Processor (DSP), an Application Specific Integrated Circuit (ASIC), a FPGA, or other programmable logic device, a discrete gate or transistor logic, discrete hardware components, or any combination thereof designed to perform the functions described herein. Furthermore, a signal processor may be a processor or a DSP, ASIC, FPGA, or other logic device. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

Those skilled in the art will recognize improvements and modifications to the preferred embodiments of the present disclosure. All such improvements and modifications are considered within the scope of the concepts disclosed herein and the claims that follow.

What is claimed is:

1. A radio frequency (RF)-based positioning device, comprising:
   an RF receiver;
   a signal processor operable to:
      receive a receive (RX) signal from the RF receiver, the RX signal comprising a carrier signal, timing information, a reference signal, and an envelope modulation;
      estimate an RX time-of-arrival of the RX signal and a time offset between the RF receiving and the signal processor based on the timing information and the reference signal;
      based on the estimated time of arrival and the time offset, resolve a phase of the carrier signal; and
      determine a position state based on the resolved phase of the carrier signal.

2. The RF-based positioning device of claim 1, wherein an accuracy of the position state is determined by a wavelength of the carrier signal and not a bandwidth of the envelope modulation.

3. The RF-based positioning device of claim 2, wherein the accuracy of the position state is equal to or less than 30 centimeters (cm).

4. The RF-based positioning device of claim 1, wherein the RX signal is received from a base station.

5. The RF-based positioning device of claim 4, wherein the signal processor is further operable to estimate a distance and at least one of a velocity, an acceleration, or an orientation of the RF-based positioning device relative to the base station based on the position state.

6. The RF-based positioning device of claim 4, further comprising an RF transmitter configured to transmit RF transmit (TX) signals to the base station;
wherein the position state is further determined based on the resolved phase of the carrier signal relative to at least one of the RF TX signals.

7. The RF-based positioning device of claim 6, wherein the signal processor is further configured to:
estimate a TX time-of-arrival of at least one of the RF TX signals; and
determine a distance between the base station and the RF-based positioning device based on the RX time-of-arrival and the TX time-of-arrival.

8. The RF-based positioning device of claim 1, further comprising an array of antennas coupled to the RF receiver; wherein:
the RX signal is a first RX signal received over a first antenna of the array of antennas; and
the signal processor is further configured to:
receive additional RX signals over additional antennas of the array of antennas;
determine the position state further based on the additional RX signals; and
estimate a position, an orientation, and at least one of a velocity or an acceleration of the RF-based positioning device based on the position state.

9. The RF-based positioning device of claim 1, wherein the RX signal further comprises communication data.

10. The RF-based positioning device of claim 9, wherein:
the communication data comprises an encrypted communication; and
the signal processor is further configured to:
decode the RX signal to determine the encrypted communication;
modulate the RX signal to generate a reference waveform; and
determine the position state further based on the reference waveform.

11. A vehicle positioning system, comprising:
a signal transceiver configured to communicate wirelessly with a first signal node; and
a signal processor operable to:
exchange first timing information with the first signal node to synchronize a first clock in the vehicle positioning system with a second clock in the first signal node, wherein the exchange of the first timing information comprises alternate receiving an RX signal comprising first timing information from the first node and transmitting a transmit (TX) signal comprising second timing information to the first node in a plurality of timing exchanges;
synchronize a first clock in the vehicle positioning system and a second clock in the first signal node based on the exchange of the first timing information;
determine a time offset between the signal processor and the first signal node based on the exchange of the first timing information;
determine a position state based on the exchanged first timing information; and
estimate a position and at least one of a velocity, an acceleration, or an orientation of a vehicle relative to the first signal node based on the position state.

12. The vehicle positioning system of claim 11, wherein:
determining the position state comprises estimating a time-of-arrival of the plurality of TX signals and the plurality of RX signals; and
the time-of-arrival estimation is phase-accurate.

13. The vehicle positioning system of claim 12, wherein determining the position state further comprises correcting for frequency and Doppler offsets based on a sequence of time-of-arrival estimates.

14. The vehicle positioning system of claim 11, wherein the signal processor is further operable to:
exchange second timing information with a second signal node; and
determine the position state by:
recovering a phase-accurate first time-of-arrival between the first signal node and the vehicle positioning system; and
recovering a phase-accurate second time-of-arrival between the second signal node and the vehicle positioning system.

15. The vehicle positioning system of claim 14, further comprising an array of antennas;
wherein estimating the position and at least one of the velocity, the acceleration, or the orientation uses time-of-arrival estimates for each of the array of antennas.

16. The vehicle positioning system of claim 14, wherein estimating the position comprises determining relative distances to the first signal node and the second signal node based on the first time-of-arrival and the second time-of arrival.

17. The vehicle positioning system of claim 16, wherein the relative distances are accurate within 30 centimeters (cm).

18. The vehicle positioning system of claim 11, wherein the first timing information is exchanged over radio frequency (RF) carrier signals, each having a bandwidth less than or equal to 10 megaHertz (MHz).

19. The vehicle positioning system of claim 18, wherein:
determining the position state further comprises recovering a phase of a series of exchanged timing signals;
estimating a derivative of the phase of the series of exchanged timing signals to correct for frequency offsets and frequency drifts in the position state.

* * * * *